(12) United States Patent
Hosono et al.

(10) Patent No.: US 12,242,675 B2
(45) Date of Patent: Mar. 4, 2025

(54) MULTI-WAY INPUT DEVICE

(71) Applicant: ALPS ALPINE CO., LTD., Tokyo (JP)

(72) Inventors: Kunio Hosono, Fukushima (JP); Yasuji Hagiwara, Miyagi (JP); Tetsuo Muranaka, Miyagi (JP); Sadayuki Yaginuma, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/591,492

(22) Filed: Feb. 29, 2024

(65) Prior Publication Data

US 2024/0201798 A1 Jun. 20, 2024

Related U.S. Application Data

(63) Continuation of application No. PCT/JP2022/010660, filed on Mar. 10, 2022.

(30) Foreign Application Priority Data

Sep. 6, 2021 (JP) ................. 2021-144605

(51) Int. Cl.
*G06F 3/0338* (2013.01)
*G05G 9/047* (2006.01)
(Continued)

(52) U.S. Cl.
CPC .......... *G06F 3/0338* (2013.01); *G05G 9/047* (2013.01); *G06F 3/0205* (2013.01); *G06F 3/033* (2013.01); *G06F 3/0346* (2013.01)

(58) Field of Classification Search
CPC ...... G06F 3/0338; G06F 3/0205; G06F 3/033; G06F 3/0346; G06F 3/02; G06F 3/023; G05G 9/047; H01H 25/04
See application file for complete search history.

(56) References Cited

U.S. PATENT DOCUMENTS 5,499,041 A * 3/1996 Brandenburg ......... G05G 9/047
345/174
6,293,160 B1 * 9/2001 Shigemoto ............ G06F 3/0338
73/862.632
(Continued)

FOREIGN PATENT DOCUMENTS

JP 2002-157063 5/2002
JP 2012-064446 3/2012
(Continued)

OTHER PUBLICATIONS

International Search Report for PCT/JP2022/010660 mailed on Jun. 14, 2022.

*Primary Examiner* — Mihir K Rayan
(74) *Attorney, Agent, or Firm* — IPUSA, PLLC

(57) ABSTRACT

A multi-way input device includes a strain-generating element, strain detection elements, and a tilt operation unit including an operation shaft configured to tilt. The strain-generating element includes a base portion, detection arms extending in respective directions from the base portion, support legs, and locking arms each of which is provided to extend from the base portion, each of the locking arms having an upper surface and being situated between adjacent detection arms among the detection arms. The upper surface of each of the locking arms contacts a lower surface of the tilt operation unit, and each of the detection arms does not contact the lower surface of the tilt operation unit.

12 Claims, 14 Drawing Sheets

(51) Int. Cl.
*G06F 3/02* (2006.01)
*G06F 3/033* (2013.01)
*G06F 3/0346* (2013.01)

(56) References Cited

U.S. PATENT DOCUMENTS

| | | | | |
|---|---|---|---|---|
| 6,693,624 B1 * | 2/2004 | Niiyama | ................ | G05G 9/047 |
| | | | | 345/157 |
| 2022/0334608 A1 * | 10/2022 | Ninomiya | .......... | G05G 9/04796 |

FOREIGN PATENT DOCUMENTS

| | | |
|---|---|---|
| JP | 2013-065398 | 4/2013 |
| JP | 2017-033455 | 2/2017 |
| JP | 2021-086566 | 6/2021 |

\* cited by examiner

MULTI-WAY INPUT DEVICE

CROSS-REFERENCE TO RELATED APPLICATIONS

This application is a continuation application of International Application No. PCT/JP2022/010660, filed on Mar. 10, 2022, and designating the U.S., which is based upon and claims priority of Japanese Patent Application No. 2021-144605, filed on Sep. 6, 2021, the entire contents of which are incorporated herein by reference.

BACKGROUND

1. Field of the Invention

The present disclosure relates to a multi-way input device.

2. Description of the Related Art

Patent Document 1 discloses a multi-way switch system used for an electronic device. In the input switch system, an alumina plate on which multiple thick-film resistors are disposed between a protrusion and a base is disposed, and these thick-film resistors are used to convert stress applied to the protrusion in multiple directions, to respective electric signals.

Patent Document 2 discloses a multi-way input device (which is called an analog stick controller) in which a tilt operation can be performed using an operation member. In such a input device, a tilt direction and a tilt angle of the operation member can be detected.

RELATED-ART DOCUMENT

[Patent Document]
  [Patent Document 1] Japanese Unexamined Patent Application Publication No. 2002-157063 [Patent Document 2] Japanese Unexamined Patent Application Publication No. 2013-65398

SUMMARY

A multi-way input device according to one embodiment includes a strain-generating element, multiple strain detection elements provided for the strain-generating element, and a tilt operation unit including an operation shaft configured to tilt, the tilt operation unit having a lower surface. The strain-generating element includes a base portion provided at a central portion of the strain-generating element, detection arms extending in respective directions from the base portion, support legs provided to protrude downward from respective ends of the detection arms, and locking arms each of which is provided to extend from the base portion, each of the locking arms having an upper surface and being situated between adjacent detection arms among the detection arms. The upper surface of each of the locking arms contacts the lower surface of the tilt operation unit, and each of the detection arms does not contact the lower surface of the tilt operation unit.

DESCRIPTION OF THE EMBODIMENTS

Figure 1:
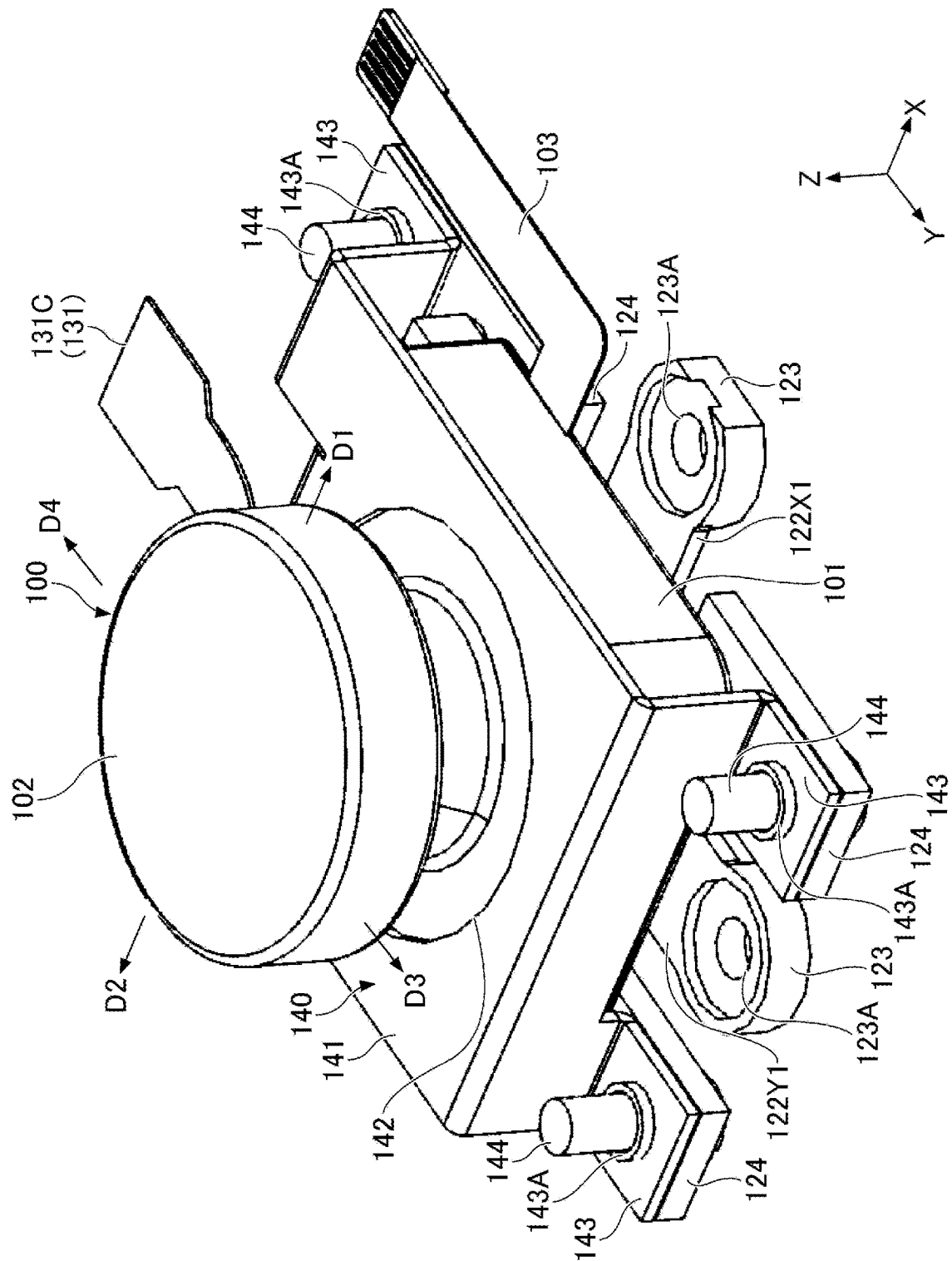
FIG. 1 is an external perspective view of an upper surface side of a multi-way input device according to a first embodiment.

The inventors of this application have found that when a load applied to a tilt operation unit of an analog stick controller or the like in each of directions can be detected, various types of operations by the tilt operation unit are enabled. In such a situation, the inventors have recognized that a technique for detecting the load applied to the tilt operation unit in each of the directions, with high accuracy, has not been created.

Hereinafter, various embodiments will be described. In the following description, for convenience, in the drawings, a Z-axis direction refers to a vertical direction, and each of an X-axis direction and a Y-axis direction refers to a horizontal direction.

First Embodiment (Configuration of Multi-Way Input Device 10)

Figure 2:
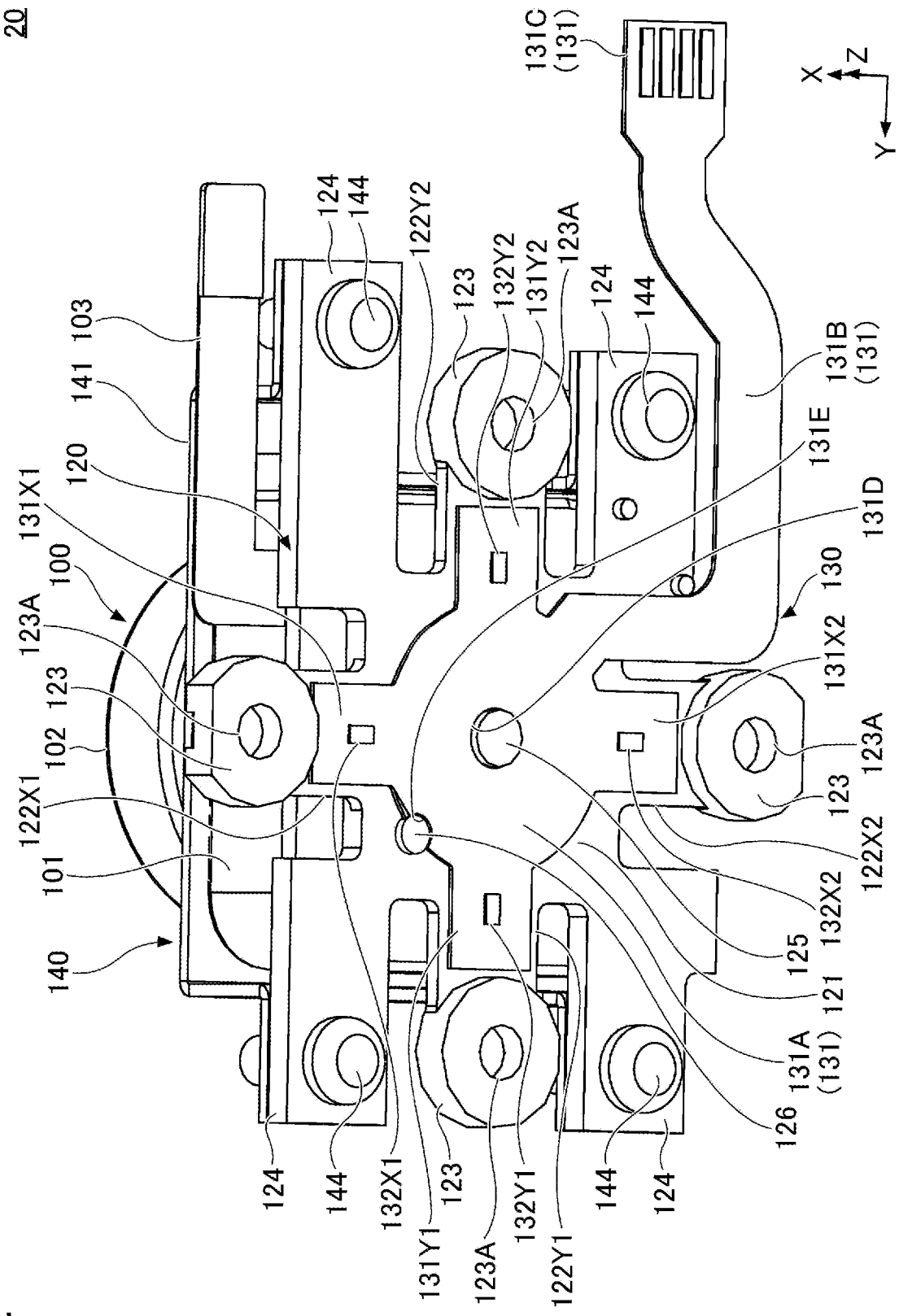
FIG. 2 is an external perspective view of a lower surface side of the multi-way input device according to the first embodiment.
Figure 3:
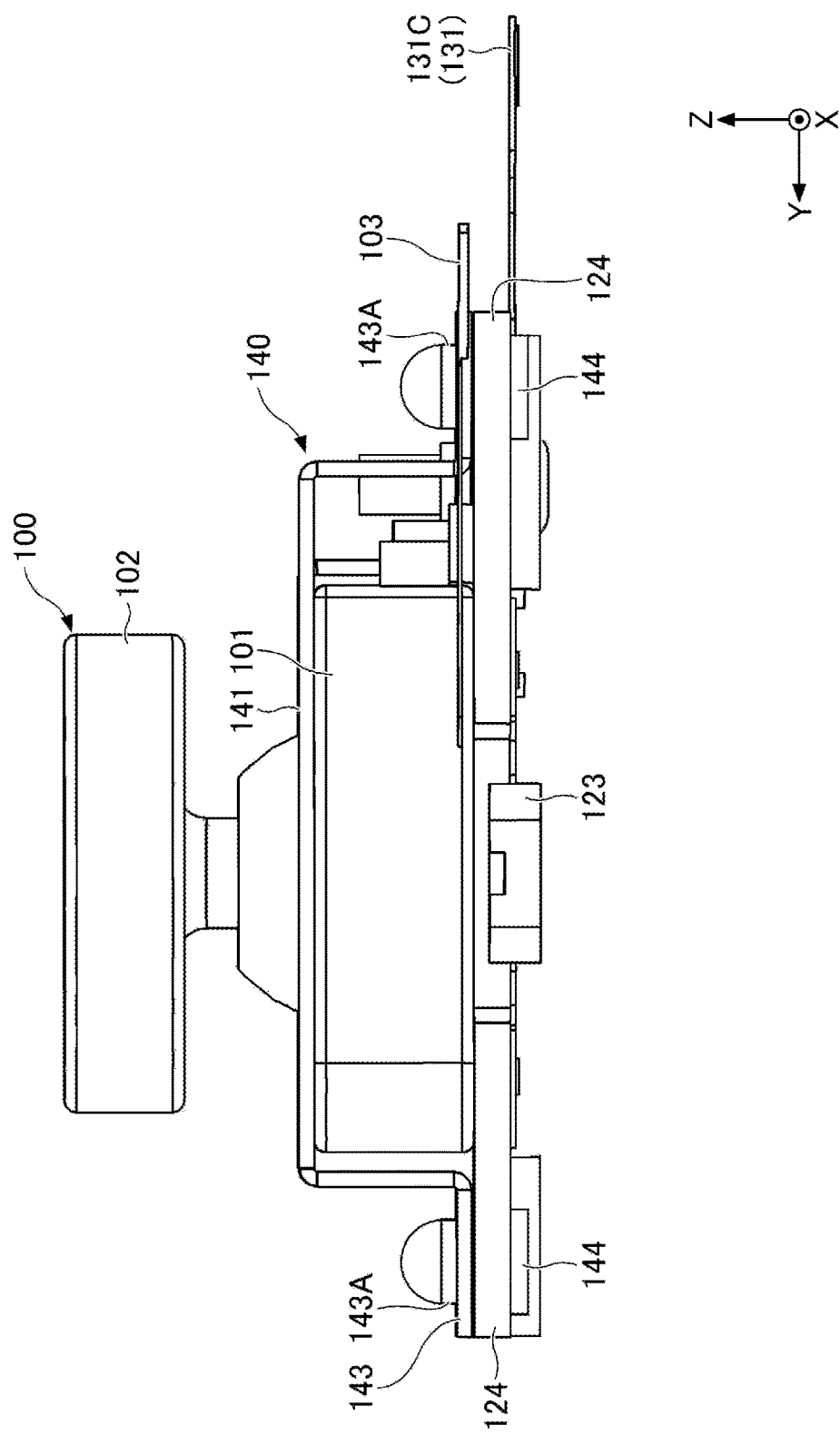
FIG. 3 is a side view of the multi-way input device according to the first embodiment.
Figure 4:
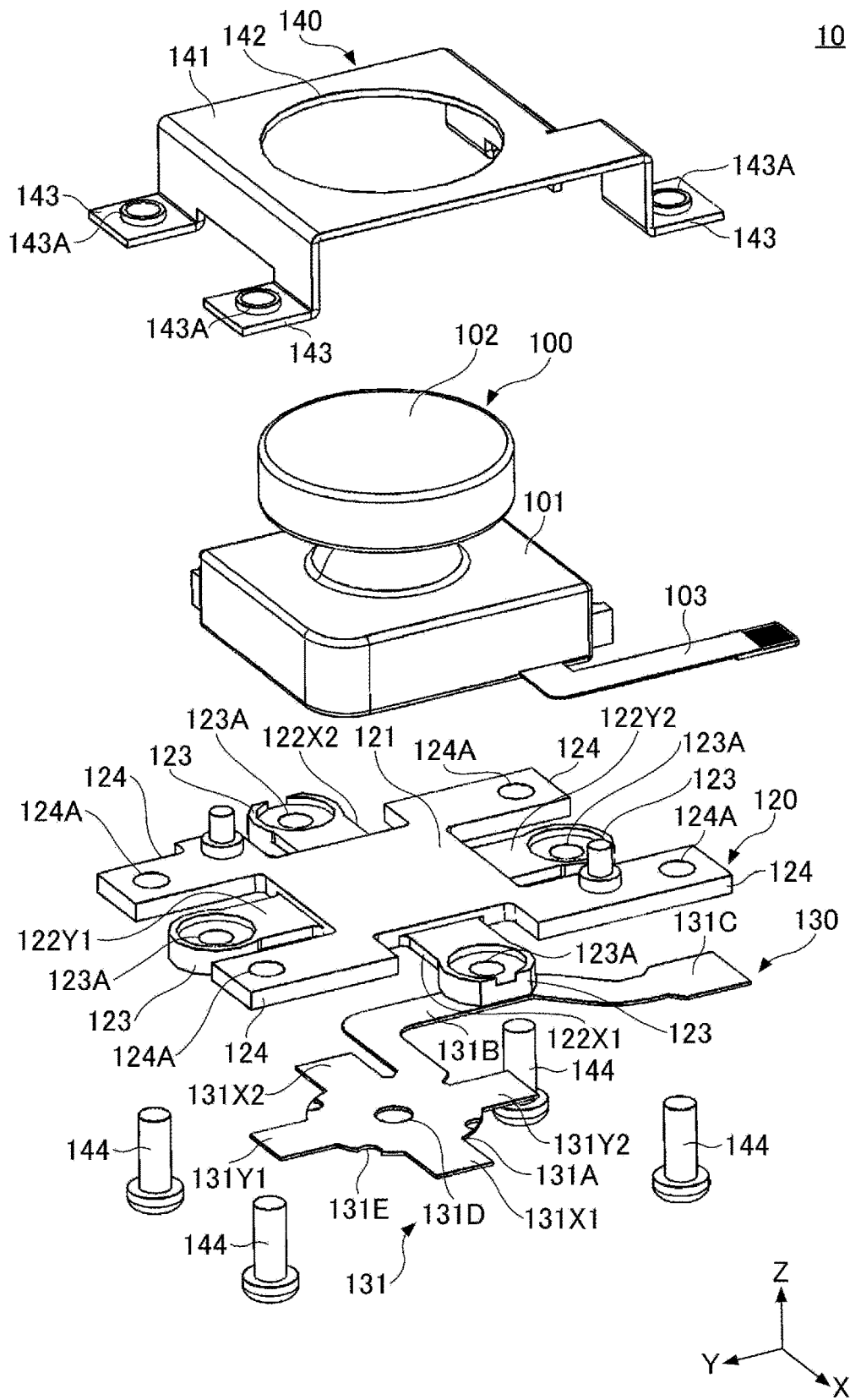
FIG. 4 is an exploded perspective view of the multi-way input device according to the first embodiment.
Figure 5:
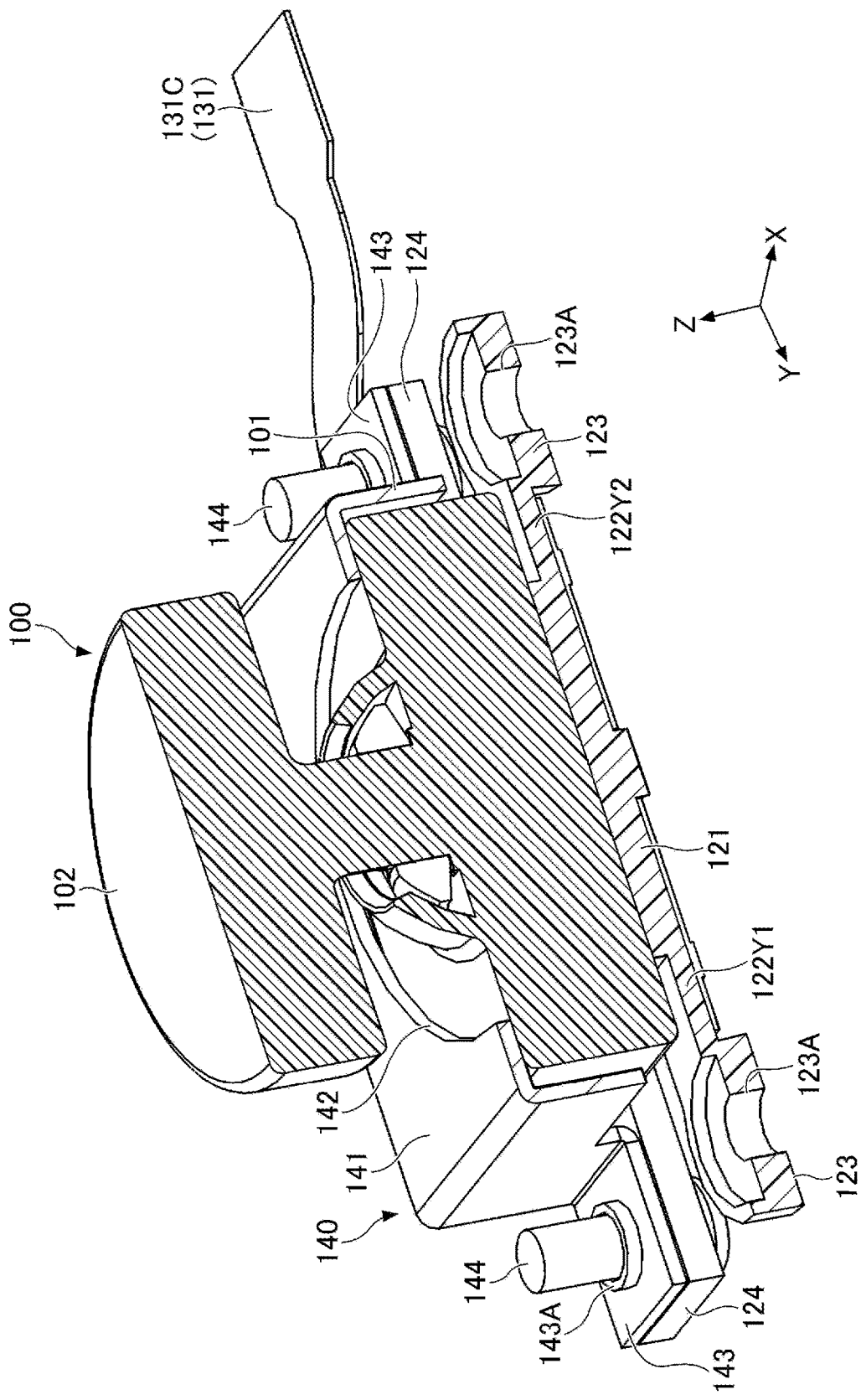
FIG. 5 is a sectional view of the multi-way input device according to the first embodiment.

FIG. 1 is an external perspective view of an upper surface side of a multi-way input device 10 according to a first embodiment. FIG. 2 is an external perspective view of a lower surface side of the multi-way input device 10 according to the first embodiment. FIG. 3 is a side view of the multi-way input device 10 according to the first embodiment. FIG. 4 is an exploded perspective view of the multi-way input device 10 according to the first embodiment. FIG. 5 is a cross-sectional view of the multi-way input device 10 according to the first embodiment.

The multi-way input device 10 shown in FIGS. 1 to 5 is an input device that allows for a multi-way input operation, and the input device is used in an industrial vehicle, a robot operation, or the like. As shown in FIGS. 1 to 5, the multi-way input device 10 includes an analog stick controller 100 that is used as an example of a "tilt operation unit."

The analog stick controller 100 includes a housing 101, an operation stick 102, and a flexible printed circuit (FPC) 103. The housing 101 has a rectangular parallelepiped shape that is thin in the vertical direction (Z-axis direction). The operation stick 102 is provided to protrude upward from the upper surface of the housing 101. The operation stick 102 is an example of an "operation shaft." The operation stick 102 is provided so as to be inclinable with respect to the housing 101, and is a portion on which a tilt operation is performed by a user. The FPC 103 is a flexible film-like wiring member that is drawn out from the inside of the housing 101 toward the outside of the housing 101. When the operation stick 102 tilts, the analog stick controller 100 externally outputs an operational signal (analog signal) corresponding to a tilt direction and a tilt angle of the operation stick 102, via the FPC 103. The analog stick controller 100 can tilt in X-axis directions (a D1-direction and a D2-direction in FIG. 1) and Y-axis directions (a D3-direction and a D4-direction in FIG. 1), through the operation stick 102. The analog stick controller 100 can tilt in both the X-axis direction and the Y-axis direction, through the operation stick 102.

As shown in FIGS. 1 to 5, the multi-way input device 10 includes a flat strain-generating element 120 that is provided to overlap the lower surface of the analog stick controller 100, and includes a load detector 130 that is bonded to the lower surface of the strain-generating element 120. The multi-way input device 10 operates as an isometric pointing stick. The load detector 130 can detect strain generated in each of directions (X-axis direction and Y-axis direction) of the strain-generating element 120, by applying a load to the analog stick controller 100, and then can externally output a strain detection signal (analog signal) indicating the detected strain, as a detection signal indicating both the direction in which the load is applied and the magnitude of the load. The multi-way input device 10 is designed such that a maximum load to be detected by the load detector 130 is greater than a load required for the analog stick controller 100 to be inclined at a maximum angle. Thus, even when the analog stick controller 100 is inclined at the maximum angle, the multi-way input device 10 can output a signal indicating the magnitude and direction of the load applied to the operation stick 102, and the load is detected by the load detector 130. Therefore, the entire multi-way input device 10 can operate in an operational range that is beyond an operational range of the analog stick controller 100. That is, the multi-way input device 10 can provide a wider dynamic range.

As shown in FIGS. 1 to 5, the multi-way input device 10 includes a hold-down plate 140. The hold-down plate 140 holds down the analog stick controller 100, and fixes the analog stick controller 100 to the strain-generating element 120. For example, the hold-down plate 140 is formed by processing (bending, punching, or the like) a metal plate. The hold-down plate 140 includes a holding portion 141, a first through-hole 142, and multiple mounting legs 143. The holding portion 141 is a planar portion that extends horizontally and that holds down the analog stick controller 100. The first through-hole 142 is provided at a central portion of the holding portion 141, and the operation stick 102 of the analog stick controller 100 extends through the first through-hole 142. The multiple mounting legs 143 are planar portions that extend horizontally. Each of the mounting legs 143 is provided at a height position lower than the holding portion 141, so as to protrude outward in the Y-axis direction from the holding portion 141. Second through-holes 143A are formed in the respective mounting legs 143. The mounting legs 143 are respectively secured to locking arms 124 of the strain-generating element 120, by using securing pieces 144 passing through the locking arms 124 and the second through-holes 143A. The holding portion 141 is configured as described above, thereby enabling the analog stick controller 100 to be firmly secured to the strain-generating element 120.

(Configuration of Strain-Generating Element 120)

Hereinafter, the configuration of the strain-generating element 120 will be described with reference to FIGS. 1 to 5. As shown in FIGS. 1 to 5, the strain-generating element 120 includes a base portion 121 and four detection arms 122 (detection arms 122X1, 122X2, 122Y1, and 122Y2).

The base portion 121 is a square portion in a plan view, and the square portion is provided at a central portion (which is disposed coaxially with a center axis of the operation stick 102) of the strain-generating element 120.

The four detection arms 122 are arm-shaped portions each of which is provided to protrude from the base portion 121 in a corresponding direction among four horizontal directions.

Specifically, a detection arm 122X1 is a portion having a constant width, and this portion extends linearly from an outer peripheral edge (a positive X-axis-side side) of the base portion 121 in a positive X-axis direction.

A detection arm 122X2 is a portion having a constant width, and this portion extends linearly from the outer peripheral edge (a negative X-axis-side side) of the base portion 121 in a negative X-axis direction.

A detection arm 122Y1 is a portion having a constant width, and this portion extends linearly from the outer peripheral edge (a positive Y-axis-side side) of the base portion 121 in a positive Y-axis direction.

A detection arm 122Y2 is a portion having a constant width, and this portion extends linearly from the outer peripheral edge (a negative Y-axis-side side) of the base portion 121 in a negative Y-axis direction.

(Configuration of Load Detector 130) Hereinafter, the configuration of the load detector 130 will be described with reference to FIGS. 1 to 5. As shown in FIGS. 1 to 5, the load detector 130 includes a flexible printed circuit (FPC) 131 and four strain detection elements 132 (strain detection elements 132X1, 132X2, 132Y1, 132Y2). The strain detection elements 132 are resistors that are printed in the FPC 131. With this arrangement, each of the strain detection elements 132 is deformed together with the FPC 131, so that a resistance value changes.

The FPC 131 is an example of a "flexible substrate," and is a film-like wiring member that is flexible. The FPC 131 includes a base portion 131A, a lead-out portion 131B, and a connection portion 131C. The base portion 131A is a circular portion in a plan view, and the circular portion is disposed at the central portion (which is disposed coaxially with a center axis of the operation stick 102) of the lower surface of the strain-generating element 120. The lead-out portion 131B is a portion that extends horizontally from the base portion 131A to the exterior of the multi-way input device 10. The connection portion 131C is provided at a top end of the lead-out portion 131B, and is a portion to be connected to an external component (a connector or the like). The FPC 131 externally outputs a strain detection value output from each of the four strain detection elements 132 via the connection portion 131C.

The FPC 131 has four protruding portions 131X1, 131X2, 131Y1, and 131Y2 each of which is provided to protrude from the base portion 131A in a corresponding direction among the four horizontal directions.

A protruding portion 131X1 is a portion having a constant width, and this portion extends linearly from the outer peripheral edge of the base portion 131A in the positive X-axis direction. Also, the portion overlaps the detection arm 122X1 of the strain-generating element 120.

A protruding portion 131X2 is a portion having a constant width, and this portion extends linearly from the outer peripheral edge of the base portion 131A in the negative X-axis direction. Also, the portion overlaps the detection arm 122X2 of the strain-generating element 120.

A protruding portion 131Y1 is a portion having a constant width, and this portion extends linearly from the outer peripheral edge of the base portion 131A in the positive Y-axis direction. Also, the portion overlaps the detection arm 122Y1 of the strain-generating element 120.

A protruding portion 131Y2 is a portion having a constant width, and this portion extends linearly from the outer peripheral edge of the base portion 131A in the negative Y-axis direction. Also, the portion overlaps the detection arm 122Y2 of the strain-generating element 120.

The four strain detection elements 132 are disposed on the respective protruding portions 131X1, 131X2, 131Y1, and 131Y2 of the FPC 131. That is, in the FPC 131, each of the four strain detection elements 132 is disposed along a corresponding direction, among the four directions, with respect to the center axis of the operation stick 102. Each of the four strain detection elements 132 detects strain that is generated in the strain-generating element 120 due to a load that is applied to the analog stick controller 100 and is transmitted to the strain-generating element 120.

Specifically, the strain detection element 132X1 is disposed on the protruding portion 131X1 of the FPC 131. That is, the strain detection element 132X1 is disposed for the detection arm 122X1 of the strain-generating element 120. The strain detection element 132X1 detects strain generated in the detection arm 122X1 of the strain-generating element 120, and outputs a strain detection value indicating the strain of the detection arm 122X1.

The strain detection element 132X2 is disposed on the protruding portion 131X2 of the FPC 131. That is, the strain detection element 132X2 is disposed for the detection arm 122X2 of the strain-generating element 120. The strain detection element 132X2 detects strain generated in the detection arm 122X2 of the strain-generating element 120, and outputs a strain detection value indicating the strain of the detection arm 122X2.

The strain detection element 132Y1 is disposed on the protruding portion 131Y1 of the FPC 131. That is, the strain detection element 132Y1 is disposed for the detection arm 122Y1 of the strain-generating element 120. The strain detection element 132Y1 detects strain generated in the detection arm 122Y1 of the strain-generating element 120, and outputs a strain detection value indicating the strain of the detection arm 122Y1.

The strain detection element 132Y2 is disposed on the protruding portion 131Y2 of the FPC 131. That is, the strain detection element 132Y2 is disposed for the detection arm 122Y2 of the strain-generating element 120. The strain detection element 132Y2 detects strain generated in the detection arm 122Y2 of the strain-generating element 120, and outputs a strain detection value indicating the strain of the detection arm 122Y2.

(More Detailed Configuration of Strain-Generating Element 120)

Figure 6:
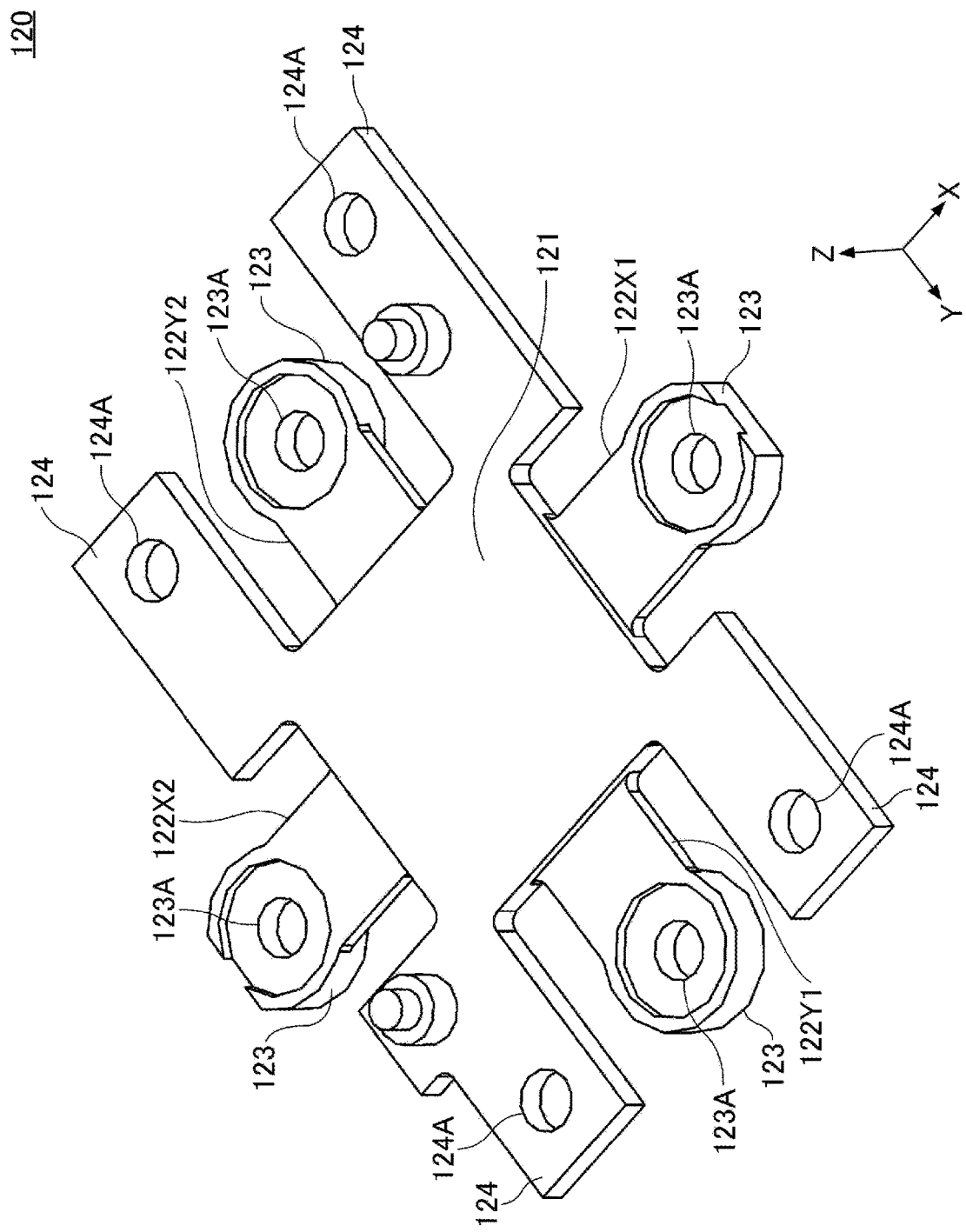
FIG. 6 is an external perspective view of the upper surface side of a strain-generating element according to the first embodiment.
Figure 7:
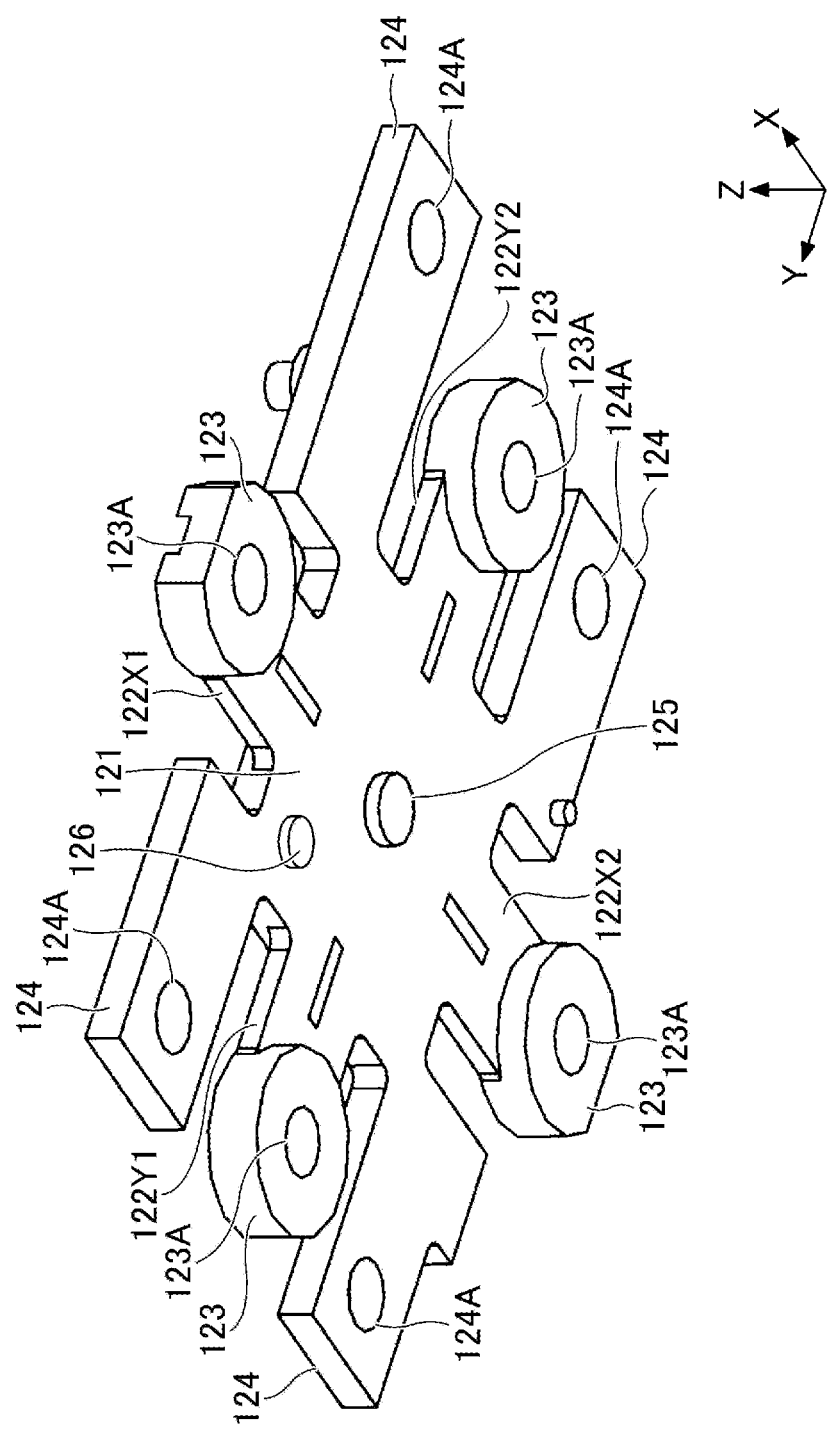
FIG. 7 is a lower surface side of the strain-generating element according to the first embodiment (a state where a load detector is not disposed).
Figure 8:
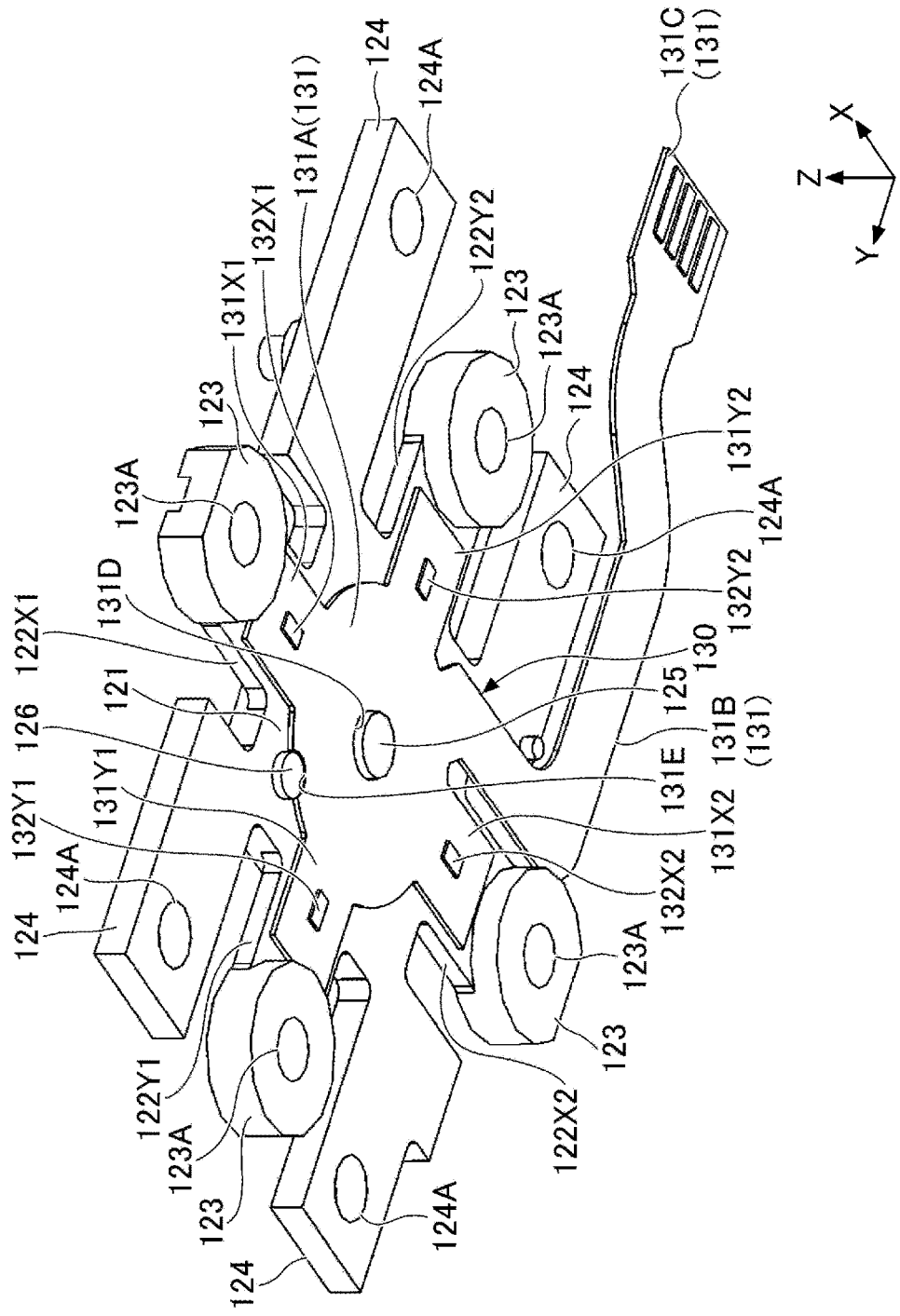
FIG. 8 is a lower surface side of the strain-generating element according to the first embodiment (a state where the load detector is disposed).

Thereinafter, a more detailed configuration of the strain-generating element 120 will be described with reference to FIGS. 6 to 8. FIG. 6 is an external perspective view of the upper surface side of the strain-generating element 120 according to the first embodiment. FIG. 7 is an external perspective view of the lower surface side of the strain-generating element 120 according to the first embodiment (a state where the load detector 130 is not disposed). FIG. 8 is an external perspective view of the lower surface side of the strain-generating element 120 according to the first embodiment (a state where the load detector 130 is disposed).

As shown in FIGS. 6 to 8, each of the four detection arms 122 (detection arms 122X1, 122X2, 122Y1, and 122Y2) of the strain-generating element 120 is provided to extend in a corresponding direction, among the four directions, from the outer peripheral edge (each side of the four sides) of the base portion 121 of the strain-generating element 120. Each detection arm 122 is narrower than a corresponding side among the four sides of the base portion 121.

As shown in FIGS. 6 to 8, each of the four detection arms 122 (detection arms 122X1, 122X2, 122Y1, and 122Y2) of the strain-generating element 120 includes a support leg 123 that is provided to protrude downward from the top end of the detection arm 122. The support leg 123 has a circular shape in a plan view. A through-hole 123A is formed in a central portion of each of the support legs 123 so as to extend through the support leg 123 in the vertical direction. Each of the locking arms 124 is provided between adjacent detection arms among the four detection arms 122. The upper surface of each locking arm 124 is in contact with the lower surface of the housing 101 of the analog stick controller 100. In this arrangement, the locking arms 124 move together with the housing 101 of the analog stick controller 100.

In the strain-generating element 120, each of the four support legs 123 is secured to a given installation surface by a securing member such as a screw that passes through the through-hole 123A, in a state where the lower surface of the support leg 123 is in contact with the given installation surface. In the strain-generating element 120, by securing the four support legs 123 to the given installation surface, the base portion 121 and each of the four detection arms 122 are slightly separated from the given installation surface. As the detection arms 122 and the locking arms 124 are mutually provided such that the arms of the one are inserted in spaces between the arms of the other, an angle formed between the housing 101 of the analog stick controller 100 and the installation surface can be accurately measured. In addition, when the load is applied to the strain-generating element 120, the load is concentrated on each of the four detection arms 122, and thus each detection arm 122 is more likely to be distorted.

As shown in FIG. 8, the four strain detection elements 132 are provided on the respective four protruding portions 131X1, 131X2, 131 Y1, and 131Y2 of the FPC 131. That is, in the strain-generating element 120, each of the four strain detection elements 132 is provided for a corresponding detection arm among the four detection arms 122 that are likely to be deformed. With this arrangement, with use of the four strain detection elements 132, the multi-way input device 10 according to the first embodiment can detect the load applied to the strain-generating element 120 in the directions, with higher sensitivity.

In particular, as shown in FIG. 8, each of the four strain detection elements 132 is provided so as to straddle the detection arm 122 and the base portion 121 of the strain-generating element 120 (that is, over a boundary between the detection arm 122 and the base portion 121). The strain-generating element 120 is most easily deformed at the boundary between the detection arm 122 and the base portion 121. With this arrangement, by use of the four strain detection elements 132, the multi-way input device 10 according to the first embodiment can detect the load applied to the strain-generating element 120 in the directions, with higher sensitivity.

As shown in FIGS. 6 to 8, each of the four detection arms 122 is narrower than the base portion 121, and is thinner than the base portion 121 in the vertical direction. With this arrangement, each detection arm 122 is easily deformed. As a result, with use of the four strain detection elements 132 provided for the respective detection arms 122, the multi-way input device 10 according to the first embodiment can detect the load applied to the strain-generating element 120 in the respective directions, with higher sensitivity.

In particular, in the present embodiment, the base portion 121 of the strain-generating element 120 has a square shape in a plan view. Also, the four detection arms 122 have the same shape (a linear shape having a constant width). With this arrangement, in the multi-way input device 10 according to the first embodiment, when the load is applied to the strain-generating element 120 in any one direction of the four directions, the detection arm 122 corresponding to the direction can be deformed by the same amount as in a case of the load being applied in any of the other directions. Thus, the multi-way input device 10 according to the first embodiment can equalize detection sensitivities of the four strain detection elements 132 provided in the four detection arms 122.

As shown in FIG. 7, the first protruding portion 125 that is columnar and protrudes downward is provided at the central portion of the lower surface of the base portion 121 of the strain-generating element 120. As shown in FIG. 8, the first protruding portion 125 of the strain-generating element 120 fits into a circular fitted hole 131D that is formed in the central portion of the base portion 131A of the FPC 131.

As shown in FIG. 7, a columnar second protruding portion 126 that protrudes downward is provided on the lower surface of the base portion 121 of the strain-generating element 120. As shown in FIG. 8, the second protruding portion 126 of the strain-generating element 120 fits into a circular cutout 131E that is formed at the outer peripheral edge of the base portion 131A of the FPC 131.

With this arrangement, the multi-way input device 10 according to the first embodiment can accurately position the base portion 131A of the FPC 131 with respect to the lower surface of the base portion 121 of the strain-generating element 120. Thus, each of the strain detection elements 132 provided on the FPC 131 can be disposed at an accurate position.

As shown in FIGS. 6 to 8, the strain-generating element 120 includes the locking arms 124 each of which is provided between adjacent two detection arms 122 and extends outward from the base portion 121. That is, the strain-generating element 120 includes four locking arms 124. Each of the four locking arms 124 is provided such that the end portion of the locking arm protrudes outward in the Y-axis direction from the holding portion 141 of the hold-down plate 140 in a plan view (see FIGS. 1 to 3 and 5). Each of the four locking arms 124 has a planar shape that extends horizontally. A fourth through-hole 124A is formed in the end portion of each of the locking arms 124. In a state where the mounting leg 143 of the hold-down plate 140 overlaps the upper surface of the top end portion of each of the locking arms 124, the mounting leg 143 is secured to the locking arm 124 by using a corresponding securing piece 144 passing through the fourth through-hole 124A of the top end portion of the locking arm 124 and by using the second through-hole 143A of the mounting leg 143 (see FIGS. 1 to 3 and 5). With this arrangement, in the multi-way input device 10 according to the first embodiment, the analog stick controller 100 can be secured to the strain-generating element 120 (the locking arms 124) by using the hold-down plate 140 (the mounting legs 143) that is situated outside the analog stick controller 100 in the Y-axis direction and near four corners of the analog stick controller 100.

In the present embodiment, the strain-generating element 120 is made of a thermoplastic resin, and the securing pieces 144 are formed integrally with the respective locking arms 124 of the strain-generating element 120. In the present embodiment, top ends of the securing pieces 144 are heated and swaged so that the mounting legs 143 of the hold-down plate 140 are secured to the locking arms 124. With this arrangement, in the multi-way input device 10 according to the first embodiment, the mounting legs 143 can be firmly secured to the respective locking arms 124. However, each securing piece 144 is not limited to the above example, and a screw or a rivet that is separate from the locking arm 124 may be used as the locking arm 124. The strain-generating element 120 may be made of metal. FIG. 3 shows a state where the top end of each securing piece 144 is swaged, and the other figures show a state where the top end of each securing piece 144 is not swaged.

In the strain-generating element 120, the locking arms 124 have the same thickness in the vertical direction as that of the base portion 121. The upper surface of each locking arm 124 is at the same height position as the upper surface of the base portion 121. As a result, in the strain-generating element 120, the upper surface of each locking arm 124 and the upper surface of the base portion 121 contact the lower surface of the analog stick controller 100.

On the other hand, in the strain-generating element 120, the detection arms 122 are thinner in the vertical direction than the locking arms 124 and the base portion 121. The upper surface of each detection arm 122 is located at a height position lower than the upper surface of each locking arm 124 and the upper surface of the base portion 121. With this arrangement, in the strain-generating element 120, the upper surface of each detection arm 122 does not contact the lower surface of the analog stick controller 100. That is, a space is provided between the upper surface of each detection arm and the lower surface of the analog stick controller 100. In this case, each detection arm 122 is easily deformed upward. Thus, with use of the four strain detection elements 132 provided for the four detection arms 122, the multi-way input device 10 according to the first embodiment can detect the load applied to the strain-generating element 120 with higher sensitivity.

The height position of the lower surface of the first protruding portion 125 provided on the lower surface of the base portion 121 of the strain-generating element 120 is higher than the height position of the lower surface of each of the four support legs 123. With this arrangement, when the four support legs 123 are secured to a given installation surface, a slight space is formed between the lower surface of each first protruding portion 125 and the given installation surface. In this arrangement, when the analog stick controller 100 is held down, the base portion 121 moves downward while deforming the four detection arms 122. As a result, with use of the four strain detection elements 132 provided for the respective detection arms 122, the multi-way input device 10 according to the first embodiment can detect a pressing operation in a downward direction with high sensitivity. In this case, in the multi-way input device 10 according to the first embodiment, the lower surface of the first protruding portion 125 contacts the given installation surface, and thus an amount of downward movement of the base portion 121 is limited. That is, an amount of deformation of each of the four detection arms 122 can be limited. With this arrangement, the multi-way input device 10 according to the first embodiment can prevent damage to the four strain detection elements 132 provided for the respective detection arms 122, even when a large force over a detectable load is applied to the strain-generating element 120, during the pressing operation in the downward direction.

The height of each of the support legs 123, or a difference in height between the lower surface of each support leg 123 and the lower surface of the first protruding portion 125 is, for example, about 0.2 mm, which is extremely small. In this arrangement, it is useful even if the height of each support leg 123 or the difference in height between the lower surface of each support leg 123 and the lower surface of the first protruding portion 125 is extremely small and is difficult to be visually recognized.

Second Embodiment (Configuration of Multi-Way Input Device 20)

Figure 9:
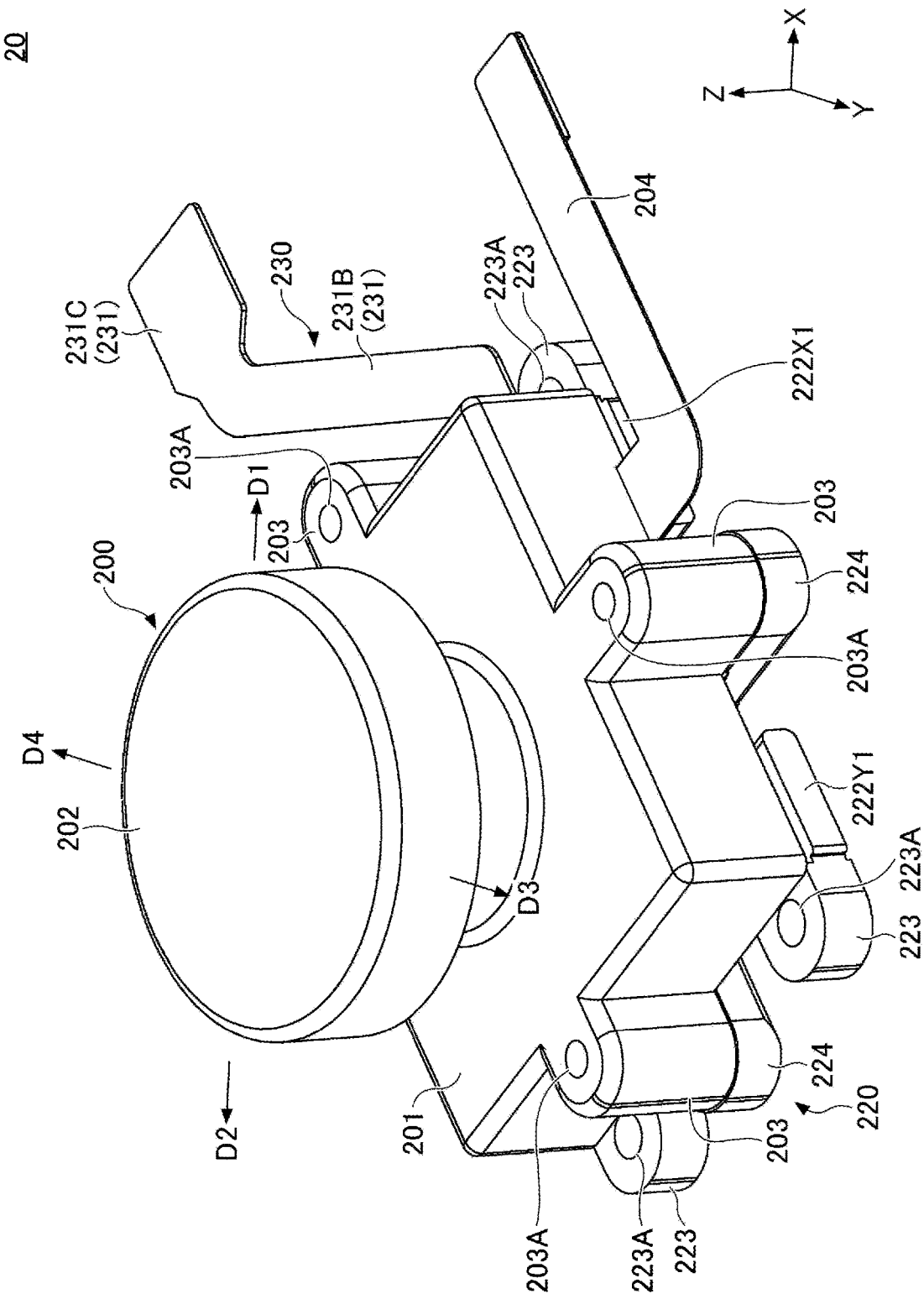
FIG. 9 is an external perspective view of the upper surface side of the multi-way input device according to a second embodiment.
Figure 10:
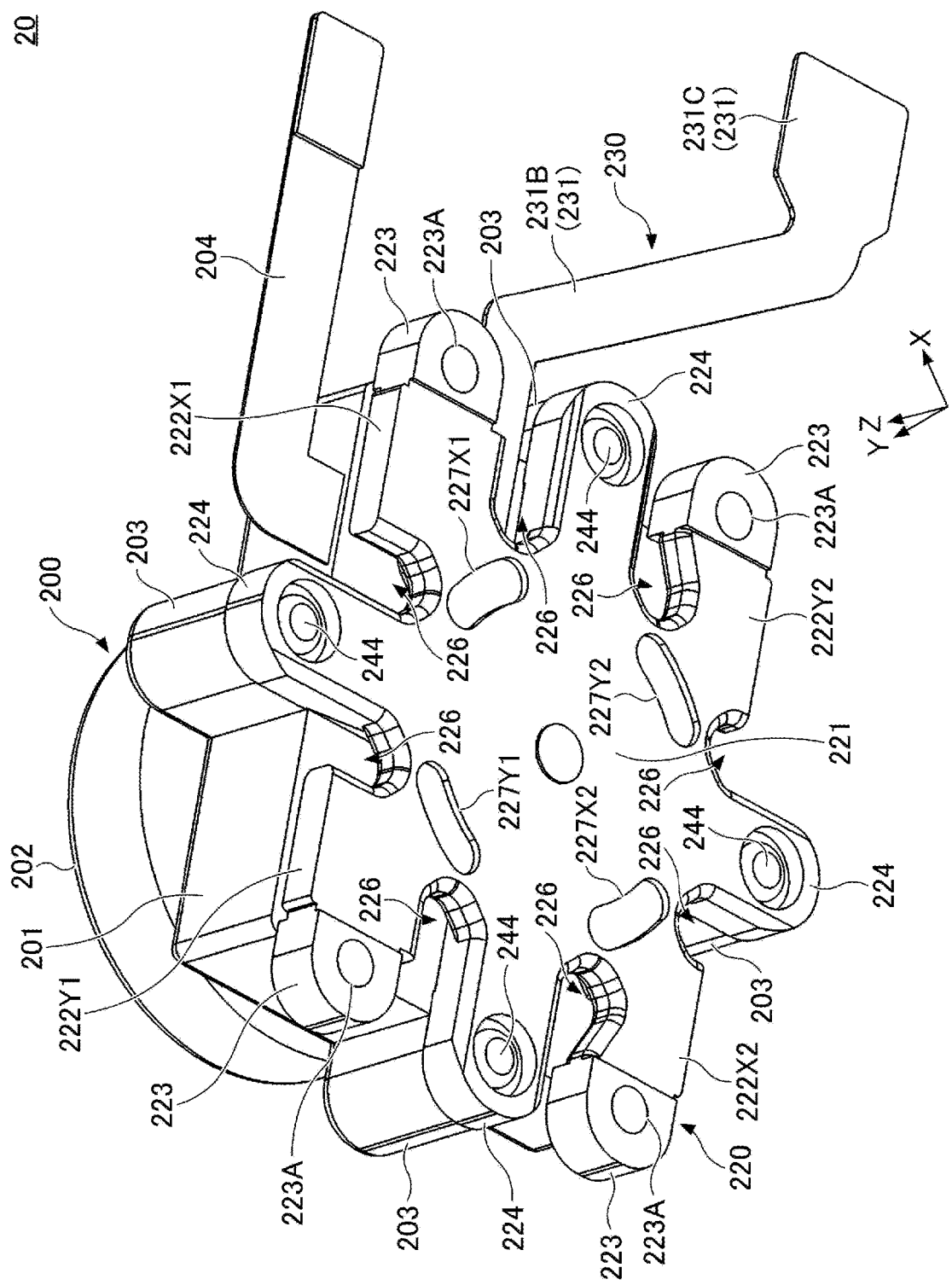
FIG. 10 is an external perspective view of the lower surface side of the multi-way input device according to the second embodiment.
Figure 11:
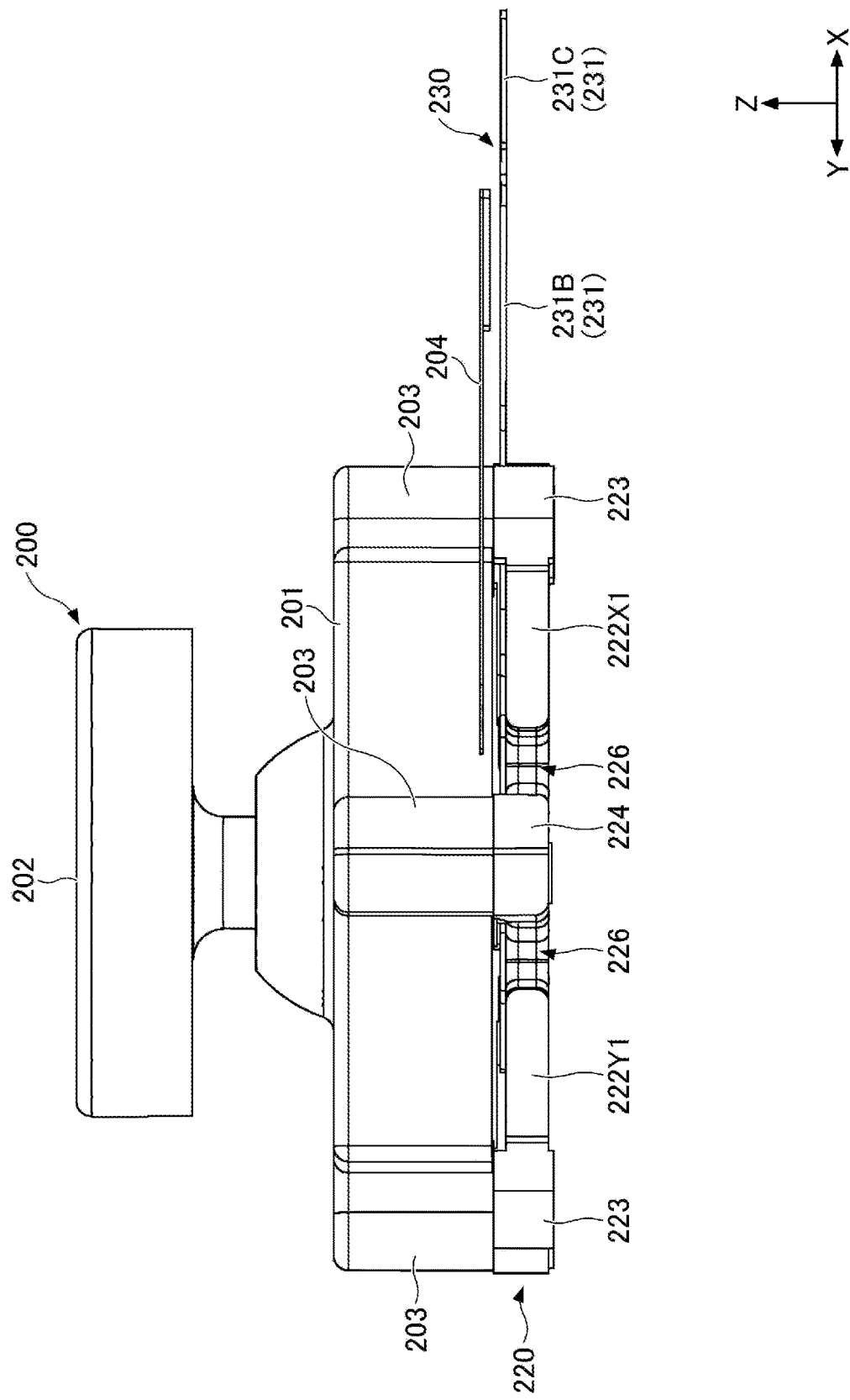
FIG. 11 is a side view of the multi-way input device according to the second embodiment.
Figure 12:
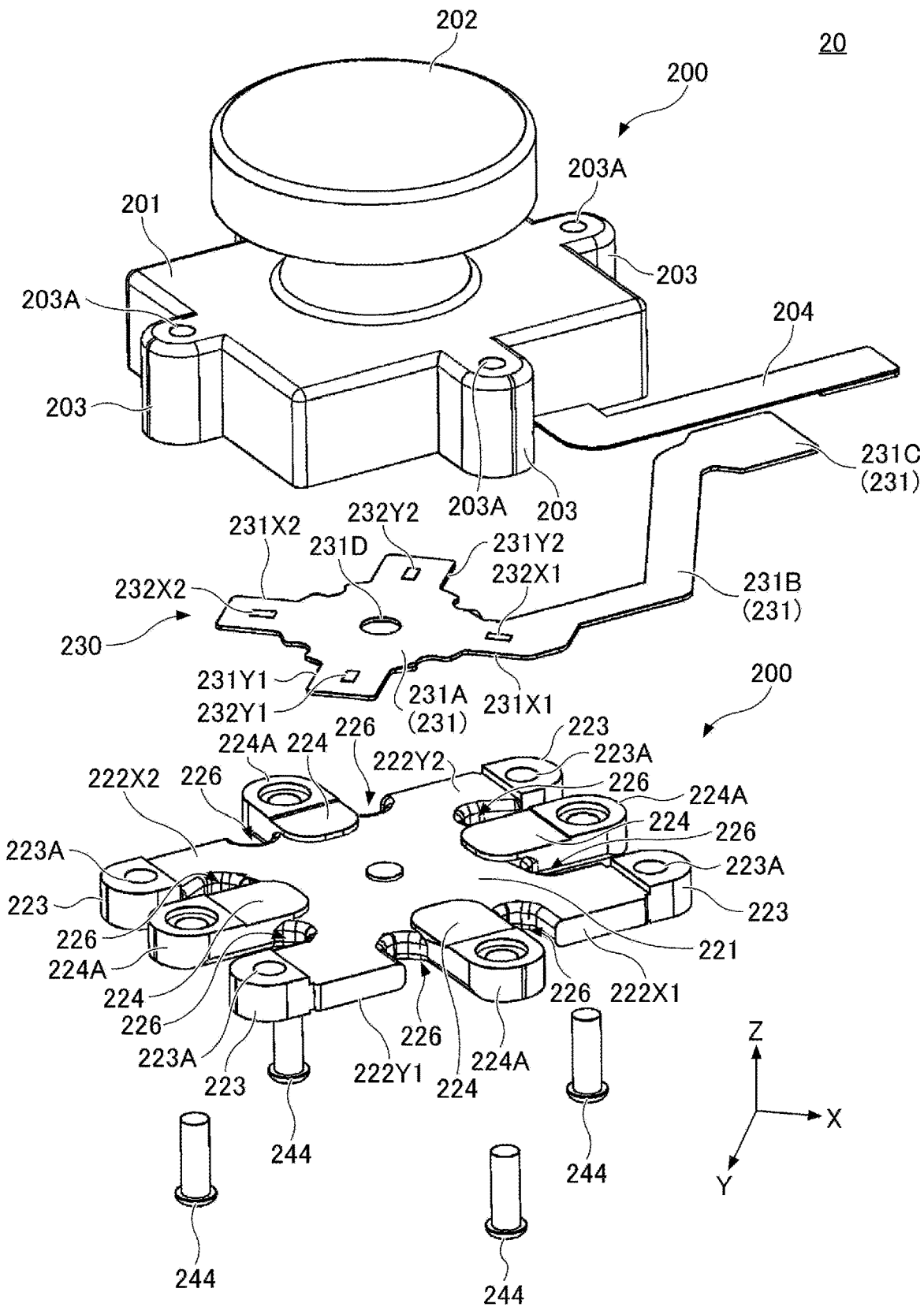
FIG. 12 is an exploded perspective view of the multi-way input device according to the second embodiment.

FIG. 9 is an external perspective view of the upper surface side of a multi-way input device 20 according to a second embodiment. FIG. 10 is an external perspective view of the lower surface side of the multi-way input device 20 according to the second embodiment. FIG. 11 is a side view of the multi-way input device 20 according to the second embodiment. FIG. 12 is an exploded perspective view of the multi-way input device 20 according to the second embodiment.

The multi-way input device 20 shown in FIGS. 9 to 12 is an input device that allows for a multi-way input operation, and the input device is used in an industrial vehicle, a robot operation, and the like. As shown in FIGS. 9 to 12, the multi-way input device 20 includes an analog stick controller 200 as an example of a "tilt operation unit."

The analog stick controller 200 includes a housing 201, an operation stick 202, and a FPC 204. The housing 201 has a rectangular parallelepiped shape that is thin in the vertical direction (Z-axis direction). The operation stick 202 is provided to protrude upward from the upper surface of the housing 201. The operation stick 202 is an example of an "operation shaft." The operation stick 202 is provided so as to be inclinable with respect to the housing 201, and is a portion with which a tilt operation is performed through a user. When the operation stick 202 tilts, the analog stick controller 200 externally outputs an operation signal (analog signal) corresponding to a tilt direction and a tilt angle of the operation stick 202, via the FPC 204. The analog stick controller 200 allows the tilt operation in the X-axis directions (the D1-direction and the D2-direction in FIG. 9) and the Y-axis direction (the D3-direction and the D4-direction in FIG. 9) to be performed through the operation stick 202. Further, the analog stick controller 200 allows the tilt operation to be performed in both the X-axis direction and the Y-axis direction through the operation stick 202. Securing portions 203, each of which protrudes horizontally from a portion in the vicinity of a middle portion of a corresponding side surface of the housing 201, are provided in the analog stick controller 200. A third through-hole 203A through each of the securing portions 203 in the vertical direction is formed in the securing portion 203.

As shown in FIGS. 9 to 12, the multi-way input device 20 includes a planar strain-generating element 220 that is provided to overlap the lower surface of the analog stick controller 200, and includes a load detector 230 that is bonded to the upper surface of the strain-generating element 220. The load detector 230 is an isometric pointing stick. The load detector 230 can detect strain generated in each of directions (X-axis direction and Y-axis direction) of the strain-generating element 220 when a load is applied to the analog stick controller 200. Then, the load detector 230 can externally output a strain detection signal (analog signal) indicating the detected strain as a detection signal indicating the direction in which the load is applied and the magnitude of the load.

(Configuration of Strain-Generating Element 220)

Hereinafter, the configuration of the strain-generating element 220 will be described with reference to FIGS. 9 to 12. As shown in FIGS. 9 to 12, the strain-generating element 220 includes a base portion 221, four detection arms 222 (detection arms 222X1, 222X2, 222Y1, and 222Y2), and four locking arms 224. In a plan view, the strain-generating element 220 has a shape similar to a rectangle similar to the housing of the analog stick controller 200. A middle portion of each of sides of the rectangular strain-generating element 220 has two cutouts 226 such that a given locking arm 224 is interposed between these cutouts. With this arrangement, the rectangular strain-generating element 220 includes the given locking arm 224 formed at the middle portion of each side of the strain-generating element.

In addition, at each corner of the rectangular strain-generating element 220, the detection arm 222 is formed between the cutout 226 of one side and the cutout 226 of the other side, and the one side and the other side form the corner. A support leg 223 is provided at the top end of each of detection arms 222. The respective support legs 223 protrude from the four corners of the housing 201.

A securing portion 224A (see FIG. 12) is provided at the top end of each locking arm 224. The securing portion 224A protrudes so as to correspond to each securing portion 203 of the housing. As shown in FIG. 10, recessed portions 227X1, 227X2, 227Y1, and 227Y2, each of which has a concave shape, are respectively provided at the back surface of the base portion 221 and in the vicinity of the detection arms 222. Thus, the thickness of the base portion is partially reduced.

The base portion 221 is a central portion (which is disposed coaxially with the center axis of the operation stick 202) of the strain-generating element 220.

Each of the four detection arms 222 is an arm-shaped portion that is provided to protrude from the base portion 221 in a corresponding direction among four horizontal directions. The support leg 223 of each detection arm 222 is provided outside the housing 201 of the analog stick controller 200. The portions of the detection arms 222, other than the support legs 223, are respectively provided in contact with the four corners of the housing 201 of the analog stick controller 200. For the purpose of making the multi-way input device compact, respective sets of support legs 223 are provided at two opposing sides of the housing 201.

The detection arm 222X1 is provided at a positive X-axis-side corner of the base portion 221, and extends in the positive X-axis direction.

The detection arm 222X2 is provided at a negative X-axis-side corner of the base portion 221, and extends in the negative X-axis direction.

The detection arm 222Y1 is provided at a positive Y-axis-side corner of the base portion 221, and extends in a positive Y-axis direction.

The detection arm 222Y2 is provided at a negative Y-axis-side corner of the base portion 221, and extends in the negative Y-axis direction.

(Configuration of Load Detector 230)

Hereinafter, the configuration of the load detector 230 will be described with reference to FIG. 12. As shown in FIG. 12, the load detector 230 includes a FPC 231 and four strain detection elements 232 (strain detection elements 232X1, 232X2, 232Y1, and 232Y2).

The FPC 231 is an example of a "flexible substrate" and is a film-like wiring member that is flexible. The FPC 231 includes a base portion 231A, a lead-out portion 231B, and a connection portion 231C. The base portion 231A is a portion that is disposed at a central portion (which is disposed coaxially with the center axis of the operation stick 202) of the upper surface of the strain-generating element 220, and this portion has a substantially circular shape in a plan view. The lead-out portion 231B is a portion that extends horizontally from the base portion 231A to an external component of the multi-way input device 20. The connection portion 231C is provided at the top end of the lead-out portion 231B, and is a portion to be connected to an external component (a connector or the like). The FPC 231 externally outputs a strain detection value output from each of the four strain detection elements 232, via the connection portion 231C.

The FPC 231 includes four protruding portions 231X1, 231X2, 231 Y1, and 231Y2 each of which is provided to protrude from the base portion 231A in a corresponding direction among four horizontal directions.

The protruding portion 231X1 is a portion having a constant width, and this portion extends linearly from the outer peripheral edge of the base portion 231A in the positive X-axis direction. Also, the portion overlaps the detection arm 222X1 of the strain-generating element 220.

The protruding portion 231X2 is a portion having a constant width, and this portion extends linearly from the outer peripheral edge of the base portion 231A in the negative X-axis direction. Also, the portion overlaps the detection arm 222X2 of the strain-generating element 220.

The protruding portion 231Y1 is a portion having a constant width, and this portion extends linearly from the outer peripheral edge of the base portion 231A in the positive Y-axis direction. Also, the portion overlaps the detection arms 222Y1 of the strain-generating element 220.

The protruding portion 231Y2 is a portion having a constant width, and this portion extends linearly from the outer peripheral edge of the base portion 231A in the negative Y-axis direction. Also, the portion overlaps the detection arms 222Y2 of the strain-generating element 220.

The four strain detection elements 232 are disposed on the respective protruding portions 231X1, 231X2, 231Y1, and 231Y2 of the FPC 231. That is, in the FPC 231, the four strain detection elements 232 are respectively disposed along four directions with respect to the central portion of the operation stick 202. Each of the four strain detection elements 232 detects strain generated in the strain-generating element 220 due to the load that is applied to the analog stick controller 200 and that is transmitted to the strain-generating element 220. The upper surface of the base portion 221 of the strain-generating element 220 is flat. On the other hand, recessed portions 227X1, 227X2, 227Y1, and 227Y2 are provided at the lower surface of the base portion 221 of the strain-generating element 220 and in the vicinity of the respective detection arms 222. The strain detection elements 232X1, 232X2, 232Y1, and 232Y2 are disposed at positions corresponding to the recessed portions 227X1, 227X2, 227 Y1, and 227Y2, when viewed at the upper surface of the strain-generating element.

Specifically, the strain detection element 232X1 is disposed on the protruding portion 231X1 of the FPC 231. The strain detection element 232X1 is disposed at a position corresponding to the recessed portion 227X1 of the strain-generating element 220. The strain detection element 232X1 detects strain generated in the recessed portion 227X1 of the strain-generating element 220. The strain detection element 232X1 outputs a strain detection value that is derived from a difference in orientation between the detection arm 222X1 and the base portion 221 that are in contact with the recessed portion 227X1.

The strain detection element 232X2 is disposed on the protruding portion 231X2 of the FPC 231. The strain detection element 232X2 is disposed at a position corresponding to the recessed portion 227X2 of the strain-generating element 220. The strain detection element 232X2 detects strain generated in the recessed portion 227X2 of the strain-generating element 220. The strain detection element 232X2 outputs a strain detection value that is derived from a difference in orientation between the detection arm 222X2 and the base portion 221 that are in contact with the recessed portion 227X2.

The strain detection element 232Y1 is disposed on the protruding portion 231Y1 of the FPC 231. The strain detection element 232Y1 is disposed at a position corresponding to the recessed portion 227Y1 of the strain-generating element 220. The strain detection element 232Y1 detects strain generated in the recessed portion 227Y1 of the strain-generating element 220. The strain detection element 232Y1 outputs a strain detection value that is derived from a difference in orientation between the detection arm 222Y1 and the base portion 221 that are in contact with the recessed portion 227Y1.

The strain detection element 232Y2 is disposed on the protruding portion 231Y2 of the FPC 231. The strain detection element 232Y2 is disposed at a position corresponding to the recessed portion 227Y2 of the strain-generating element 220. The strain detection element 232Y2 detects strain generated in the recessed portion 227Y2 of the strain-generating element 220. The strain detection element 232Y2 outputs a strain detection value that is derived from a difference in orientation between the detection arm 222Y2 and the base portion 221 that are in contact with the recessed portion 227Y2.

(More Detailed Configuration of Strain-Generating Element 220)

Figure 13:
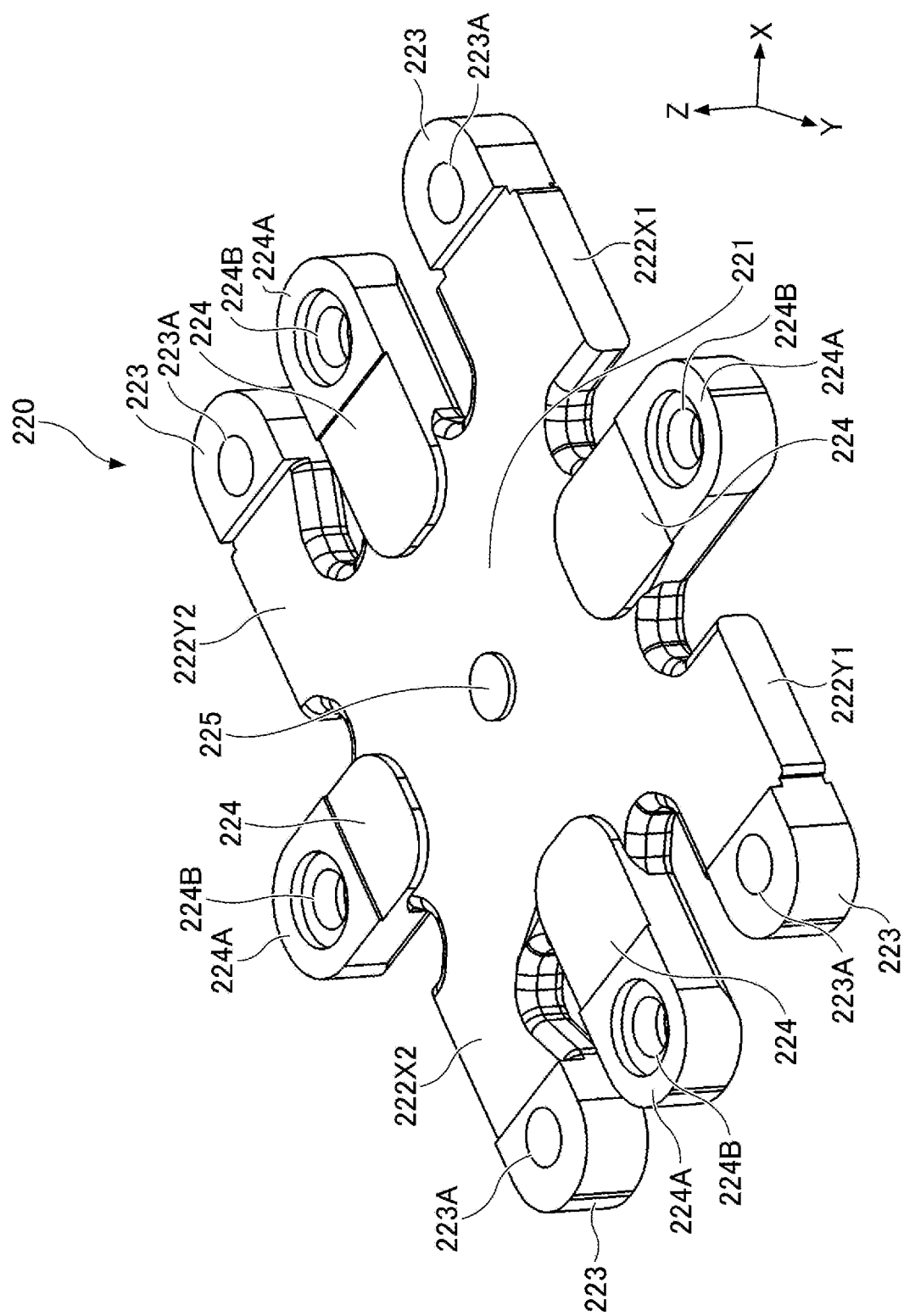
FIG. 13 is an upper surface side of the strain-generating element according to the second embodiment (the state where the load detector is not disposed).
Figure 14:
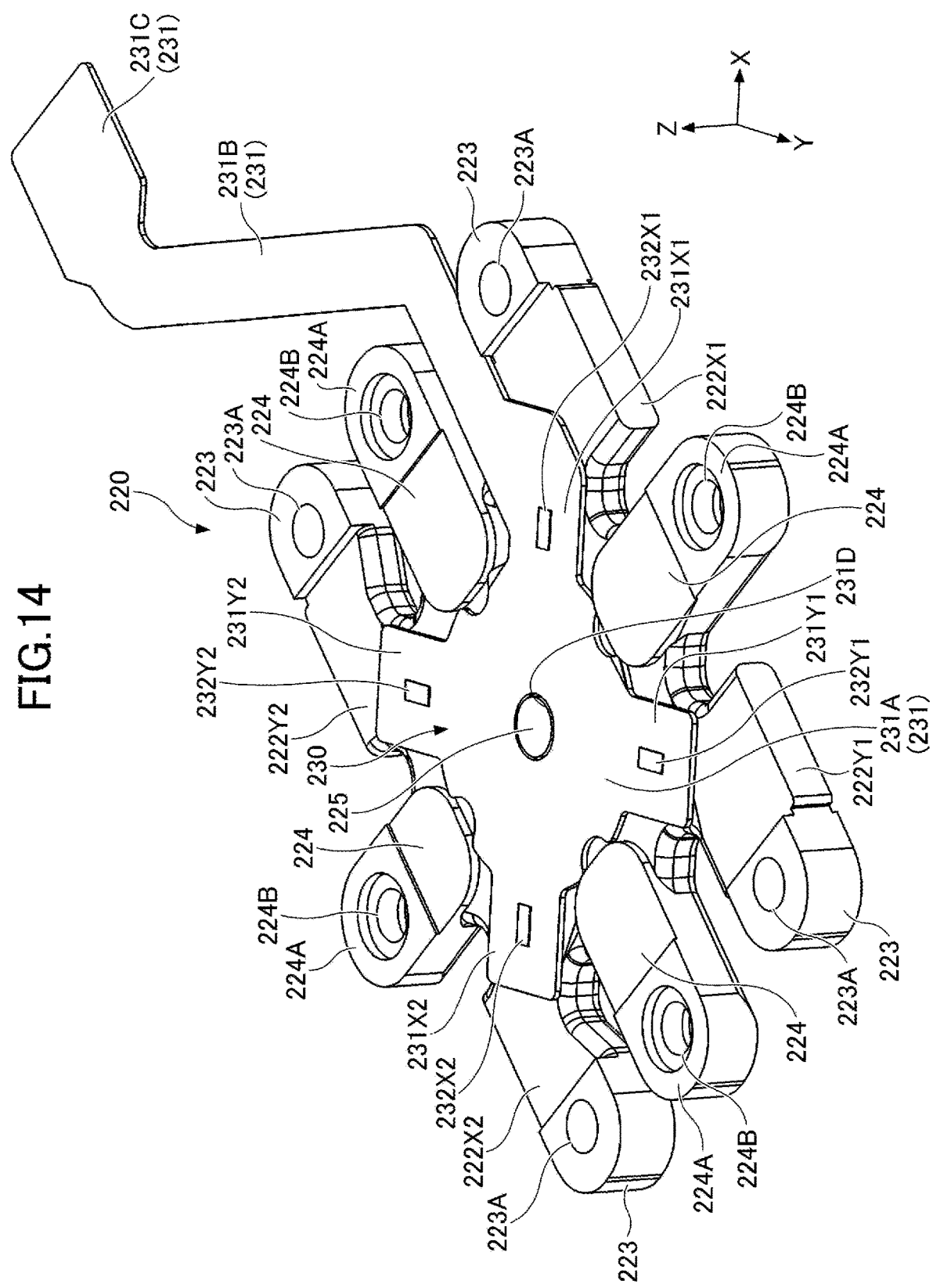
FIG. 14 is an upper surface side of the strain-generating element according to the second embodiment (the state where the load detector is disposed).

Hereinafter, a more detailed configuration of the strain-generating element 220 will be described with reference to FIGS. 13 and 14. FIG. 13 is an external perspective view of the upper surface side (a state where the load detector 230 is not disposed) of the strain-generating element 220 according to the second embodiment. FIG. 14 is an external perspective view of the upper surface side (a state where the load detector 230 is disposed) of the strain-generating element 220 according to the second embodiment.

As shown in FIGS. 13 and 14, each of the four detection arms 222 (detection arms 222X1, 222X2, 222Y1, and 222Y2) of the strain-generating element 220 is provided to extend in a corresponding direction, among the four directions, from the outer peripheral edge of the base portion 221 of the strain-generating element 220.

As shown in FIGS. 13 and 14, a top end of each of the four detection arms 222 (detection arms 222X1, 222X2, 222Y1, and 222Y2) of the strain-generating element 220 includes a support leg 223 whose thickness is slightly increased. Respective sets of support legs 223 are provided at positions from which support legs in the sets protrude from two opposing sides of the housing 201 of the analog stick controller 200. Each support leg 223 has a semicircular shape in a plan view. A through-hole 223A through the support leg 223 in the vertical direction is formed in the central portion of each support leg 223.

In the strain-generating element 220, each of the four support legs 223 is secured to a given installation surface, by using a securing member such as a screw that passes through the through-hole 223A, in a state where the lower surface of each of the four support legs 223 is in contact with the given installation surface. In the strain-generating element 220, each of the four support legs 223 is secured to the given installation surface. With this arrangement, each of the base portion 221 and the four detection arms 222 is slightly separated from the given installation surface. In this case, when a load is applied to the strain-generating element 220, the load is concentrated on the recessed portions 227X1, 227X2, 227 Y1, and 227Y2 that are respectively in the vicinity to the four detection arms 222. Thus, the strain-generating element 220 is more likely to be distorted at each of the four recessed portions 227X1, 227X2, 227Y1, and 227Y2.

As shown in FIG. 14, the four strain detection elements 232 are provided on the respective protruding portions 231X1, 231X2, 231 Y1, and 231Y2 of the FPC 231. That is, in the strain-generating element 220, the four strain detection elements 232 are respectively provided at positions corresponding to the four recessed portions 227X1, 227X2, 227 Y1, and 227Y2, which are more likely to be deformed. Thus, with use of the four strain detection elements 232, the multi-way input device 20 according to the second embodiment can detect the load that is applied to the strain-generating element 220 in each of the directions, with higher sensitivity.

As shown in FIG. 9, a securing portion 203 is provided at the middle portion of each sidewall of the housing 201. The middle portion of the sidewall of the housing 201 is close to the operation stick 202, and thus a force applied to the operation stick 202 can be transmitted to the strain-generating element 220 with high accuracy.

As shown in FIGS. 13 and 14, the upper surfaces of the four detection arms 222 are flush with the upper surface of the base portion 221. In contrast, the recessed portions 227X1, 227X2, 227 Y1, and 227Y2 are provided at the back surface of the base portion 221, and the recessed portions 227X1, 227X2, 227Y1, and 227Y2 are more likely to be deformed. The four strain detection elements 232 are provided at positions corresponding to the recessed portions 227X1, 227X2, 227 Y1, and 227Y2, when viewed at the upper surface of the base portion 221. With this arrangement, by use of the four strain detection elements 232 provided in the respective detection arms 222, the multi-way input device 20 according to the second embodiment can detect the load applied to the strain-generating element 220 in each direction, with higher sensitivity.

Distances from the center of the base portion 221 of the strain-generating element 220 to the respective recessed portions 227X1, 227X2, 227 Y1, and 227Y2 are the same. The distances from the center of the base portion 221 to the respective securing portions 203 are identical. With this arrangement, in the multi-way input device 20 according to the second embodiment, when the load is applied to the strain-generating element 220 in any one direction of the four directions, an amount of deformation of the corresponding detection arm 222 in the direction is substantially the same as in the case of the load being applied in any of the other directions. Thus, the multi-way input device 20 according to the second embodiment can equalize detection accuracy in the four strain detection elements 232 provided in the four detection arms 222. For the purpose of making the multi-way input device compact, respective sets of support legs 223 are provided so as to correspond to two opposing sides of the housing 201. There is no structure symmetry of the multi-way input device, and thus there is an exact match for the sensitivity of the strain detection elements 232. In view of the situation described above, a highly accurate output can be obtained by performing corrections.

As shown in FIGS. 13 and 14, a first protruding portion 225 that is columnar and protrudes upward is provided at the central portion of the upper surface of the base portion 221 of the strain-generating element 220. As shown in FIG. 14, the first protruding portion 225 of the strain-generating element 220 fits into a circular fitted hole 231A that is formed at the central portion of the base portion 231D of the FPC 231.

With this arrangement, the multi-way input device 20 according to the second embodiment can accurately position the base portion 231A of the FPC 231, with respect to the upper surface of the base portion 221 of the strain-generating element 220. In this case, each strain detection element 232 provided on the FPC 231 can be disposed at an accurate position.

The upper surface of the first protruding portion 225 may be in contact with the lower surface of the housing 201 of the analog stick controller 200, or may not be in contact with the lower surface of the housing 201.

As shown in FIGS. 13 and 14, the strain-generating element 220 includes the locking arms 224 each of which is provided between two adjacent detection arms 222 and that extends outward from the base portion 221. That is, the strain-generating element 220 includes four locking arms 224. The four locking arms 224 are each provided to extend outward so that the top end of the locking arm 224 corresponds to the securing portion 203 provided on a corresponding side of the housing 201 of the analog stick controller 200 in a plan view (see FIG. 9). Each of the four locking arms 224 has a planar shape that extends horizontally. Each of the locking arms 224 supports the housing 201 by contacting the housing 201 of the analog stick controller 200 at the upper surface of the top end portion of the locking arm 224. Respective through-holes 224B are provided in the four locking arms 224. Each of the securing portions 203 is secured by using the securing piece 244 that passes the through-hole 224B of the locking arm 224 and the third through-hole 203A of the securing portion 203 (see FIG. 9). With this arrangement, the multi-way input device 20 according to the second embodiment can secure the housing 201 (the securing portions 203) to the strain-generating element 220 (the locking arms 224), in the vicinity to the middle portion of each side of the housing 201 of the analog stick controller 200.

In the present embodiment, the strain-generating element 220 is made of resin, and each securing piece 244 is a screw. The securing portion 203 is provided at the middle portion of each sidewall of the housing 201, and is secured to the locking arm 224 of the strain-generating element 220, with the screw. With this arrangement, the securing pieces 244 are fixed easily and firmly. However, the securing pieces 244 are not limited to the above example. Each securing piece 244 may be formed as an individual protruding portion that is integral with the locking arm 224, and then the individual protruding portion may be heated and swaged after the individual protruding portion passes through the third through-hole 203A of the securing portion 203. The strain-generating element 220 may be made of metal.

In the strain-generating element 220, each of the locking arms 224 in the vertical direction is thicker than each of the base portion 221 and the detection arms 222. The upper surface of each locking arm 224 is located at a height position higher than the upper surfaces of the base portion 221 and the detection arms 222. With this arrangement, in the strain-generating element 220, the upper surface of each locking arm 224 contacts the lower surface of the housing 201 of the analog stick controller 200. In contrast, the upper surfaces of the base portion 221 and detection arms 222 do not contact the lower surface of the housing 201. That is, a slight space is formed between the upper surfaces of the base portion 221 and the detection arms 222, and the lower surface of the housing 201. Thus, the multi-way input device 20 according to the second embodiment can form a space at which the FPC 231 is arranged between the upper surfaces of the base portion 221 and the detection arms 222 and the lower surface of the housing 201. In addition, in the multi-way input device 20 according to the second embodiment, the housing 201 does not prevent upward deformation of the base portion 221 and the detection arms 222. With this arrangement, in the multi-way input device 20 of the second embodiment, with use of the four strain detection elements 222 provided for the respective detection arms 222, the load applied to the strain-generating element 220 in each direction can be detected with higher sensitivity.

In the strain-generating element 220, a height position of the lower surface of each of the four support legs 223 is lower than a height position of the lower surface of each of the base portion 221 and the four detection arms 222 of the strain-generating element 220. With this arrangement, when each of the four support legs 223 is secured to a given installation surface, a slight space is formed between the lower surface of each of the base portion 221 and the four detection arms 222 of the strain-generating element 220, and the given installation surface. In this arrangement, when the analog stick controller 200 is pressed downward, the four detection arms 222 are deformed while moving the base portion 221 downward. In this case, with use of the four strain detection elements 232 and the four strain detection elements 232 provided for the respective detection arms 222, the multi-way input device 20 according to the second embodiment can detect the pressing operation in a downward direction, with high sensitivity.

A downward protrusion of each of the support legs 223 (i.e., a difference in height between the lower surface of the support leg 223 and the lower surface of each the base portion 221 and the four detection arms 222) is, for example, about 0.2 mm, which is extremely small. Thus, the protrusion of each support leg 223 is useful even if it is extremely small and difficult to be visually recognized.

Although the embodiments of the present disclosure are described above in detail, the present disclosure is not limited to these embodiments, and various modifications or changes can be made within the scope of a gist of the present disclosure.

In the present disclosure, a load applied to a tilt operation unit in each of directions can be detected with high accuracy.

What is claimed is:

1. A multi-way input device comprising:
   a strain-generating element;
   multiple strain detection elements provided for the strain-generating element; and
   a tilt operation unit including an operation shaft configured to tilt, the tilt operation unit having a lower surface,
   wherein the strain-generating element includes
      a base portion provided at a central portion of the strain-generating element,
      detection arms extending in respective directions from the base portion,
      support legs provided to protrude downward from respective ends of the detection arms, and
      locking arms each of which is provided to extend from the base portion, each of the locking arms having an upper surface and being situated between adjacent detection arms among the detection arms,
   wherein the upper surface of each of the locking arms contacts the lower surface of the tilt operation unit, and
   wherein each of the detection arms does not contact the lower surface of the tilt operation unit.

2. The multi-way input device according to claim 1, further comprising:
   a flexible substrate including
      a fitted hole provided in a central portion of the flexible substrate, and
      one or more cutouts provided in outer peripheral edges of the flexible substrate,
   wherein the multiple strain detection elements are provided using the flexible substrate, and
   wherein the strain-generating element includes
      a first protruding portion provided at a central portion of the base portion, and fitting into the fitted hole, and
      one or more second protruding portions provided on the base portion, and fitting into the respective one or more cutouts.

3. The multi-way input device according to claim 1, wherein each of the detection arms is narrower than the base portion, and
   wherein each of the multiple strain detection elements is provided to straddle the base portion and a corresponding detection arm among the detection arms of the strain-generating element.

4. The multi-way input device according to claim 3, wherein each of the detection arms is thinner than the base portion.

5. The multi-way input device according to claim 2, wherein a thickness of the base portion is equal to a thickness of each of the locking arms,
   wherein the base portion has an upper surface, the upper surface of the base portion being at a same height position as upper surfaces of the locking arms, and being in contact with the lower surface of the tilt operation unit,
   wherein the first protruding portion and the one or more second protruding portions are provided on a lower surface of the strain-generating element, and
   wherein the flexible substrate is secured to the lower surface of the strain-generating element.

6. The multi-way input device according to claim 5, wherein the first protruding portion includes a lower end, the lower end being positioned higher than lower surfaces of the support legs.

7. The multi-way input device according to claim 2, wherein the strain-generating element has recessed portions each of which reduces a thickness of the base portion in proximity to a corresponding detection arm among the detection arms, and wherein the multiple strain detection elements are disposed at positions corresponding to the recessed portions.

8. The multi-way input device according to claim 7, wherein the upper surface of each of the locking arms is positioned higher than an upper surface of the base portion and upper surfaces of the detection arms, the upper surface of each of the locking arms being in contact with the lower surface of the tilt operation unit, and wherein the flexible substrate is secured to the upper surface of the base portion and the upper surfaces of the detection arms.

9. The multi-way input device according to claim 1, further comprising:

a hold-down plate that holds down the tilt operation unit so that the tilt operation unit is secured to the strain-generating element; and multiple securing pieces, wherein the hold-down plate includes a first through-hole through which the operation shaft of the tilt operation unit is disposed, and mounting legs secured to the respective locking arms, each of the mounting legs having a second through-hole through which a corresponding securing piece among the multiple securing pieces is disposed, and wherein each of the mounting legs is secured to a corresponding locking arm among the locking arms, by using the corresponding securing piece.

10. The multi-way input device according to claim 1, further comprising:

multiple securing pieces, wherein the tilt operation unit includes a housing, and through-holes provided in the housing, and wherein the tilt operation unit is secured to the locking arms by using the respective securing pieces each of which passes through a corresponding through-hole among the through-holes.

11. The multi-way input device according to claim 10, wherein the housing of the tilt operation unit has a rectangular parallelepiped shape, and wherein each of the through-holes is provided near a middle portion of a sidewall of the housing.

12. The multi-way input device according to claim 10, wherein each of the multiple securing pieces includes a screw or a rivet.

* * * * *